United States Patent
Tang et al.

(10) Patent No.: US 12,547,473 B2
(45) Date of Patent: Feb. 10, 2026

(54) FLEXIBLE SYSTEM DESIGN PATTERN FOR DISTRIBUTED SYSTEM

(71) Applicant: Microsoft Technology Licensing, LLC, Redmond, WA (US)

(72) Inventors: Wenqin Tang, Suzhou (CN); Gang Wang, Suzhou (CN); Zhaoguo Jiang, Suzhou (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 542 days.

(21) Appl. No.: 18/172,485

(22) Filed: Feb. 22, 2023

(65) Prior Publication Data
US 2024/0281298 A1    Aug. 22, 2024

(51) Int. Cl.
G06F 9/46    (2006.01)
G06F 9/50    (2006.01)

(52) U.S. Cl.
CPC ...... *G06F 9/5077* (2013.01); *G06F 2209/501* (2013.01); *G06F 2209/5011* (2013.01); *G06F 2209/5021* (2013.01)

(58) Field of Classification Search
None
See application file for complete search history.

(56) References Cited

U.S. PATENT DOCUMENTS

| | | | |
|---|---|---|---|
| 10,164,898 B2 * | 12/2018 | Tao | H04L 67/10 |
| 2013/0138816 A1 | 5/2013 | Kuo | |
| 2014/0074539 A1 | 3/2014 | Doering | |
| 2019/0340032 A1 | 11/2019 | Ganteaume | |

FOREIGN PATENT DOCUMENTS

WO    2012165937 A1    12/2012

OTHER PUBLICATIONS

Gracla et al; Deep Reinforcement Model Selection for Communications Resource Allocation in On-Site Medical Care; IEEE 2022 (Year: 2022).*

(Continued)

*Primary Examiner* — Bing Zhao

(57) ABSTRACT

Systems and methods for determining a target virtual compute resource configuration for provisioning a virtual compute resource. A provisioning system and method are described that abstract various provisioning requirements into different provisioning strategies. The provisioning strategies include logic that, when executed, determine target provisioning options (e.g., a region and subscription configuration) for provisioning a virtual compute resource. Combinations of strategies are organized into various provisioning strategy groups using modifiable metadata in a configuration table. In some examples, the provisioning system receives a request for a target configuration for provisioning a virtual compute resource. In response, the provisioning system determines a provisioning strategy group that best satisfies the request and executes the provisioning strategies included in the group to determine target provisioning options for provisioning the requested virtual compute resource.

20 Claims, 8 Drawing Sheets

(56) References Cited

OTHER PUBLICATIONS

Anuradha, et al., "A survey on resource allocation strategies in cloud computing", In International Conference on information Communication and Embedded Systems, vol. 3, Jan. 1, 2014, 7 pages.

International Search Report and Written Opinion received for PCT Application No. PCT/US2024/015886 May 31, 2024, 13 pages.

Eichelberger, Isaac, "Deploying a Microservice Architecture on IBM Cloud Code Engine", Retrieved From: https://www.ibm.com/cloud/blog/deploying-a-microservice-architecture-on-ibm-cloud-code-engine, Aug. 31, 2022, 9 Pages.

Gamage, Thilinaa, "Microservices Design Guide", Retrieved From: https://medium.com/platform-engineer/microservices-design-guide-eca0b799a7e8, Oct. 21, 2018, 17 Pages.

Indrasiri, et al., "Introduction to Cloud Native", Retrieved From: https://web.archive.org/web/20211203193701/https://www.oreilly.com/library/view/design-patterns-for/9781492090700/ch01.html, Dec. 3, 2021, 30 Pages.

Mayr, et al., "Dynamic Microservices", Retrieved From: https://web.archive.org/web/20210127152943/https://www.oreilly.com/library/view/cloud-native-evolution/9781492048794/ch04.html, Jan. 27, 2021, 12 Pages.

Richardson, Chris., "Choosing a Microservices Deployment Strategy", Retrieved From: https://www.nginx.com/blog/deploying-microservices/, Feb. 10, 2016, 12 Pages.

International Preliminary Report on Patentability received for PCT Application No. PCT/US2024/015886, mailed on Sep. 4, 2025, 07 pages.

* cited by examiner

Provisioning Strategies Data Store 112

Configuration Table 200

| | Provisioning Option 1 204a | | | Provisioning Option 2 204b | | |
|---|---|---|---|---|---|---|
| 202a Provisioning Strategy Group 1 | 206a 1st Option Strategy 1A | 210 Weight$_1$ | 212 Weight$_2$ | 208a 2nd Option Strategy 2A | 210 Weight$_1$ | 212 Weight$_2$ |
| | 206b 1st Option Strategy 1B | 210 Weight$_1$ | 212 Weight$_2$ | 208b 2nd Option Strategy 2B | 210 Weight$_1$ | 212 Weight$_2$ |
| | 206c 1st Option Strategy 1C | 210 Weight$_1$ | 212 Weight$_2$ | 208c 2nd Option Strategy 2C | 210 Weight$_1$ | 212 Weight$_2$ |
| 202b Provisioning Strategy Group 2 | 206c 1st Option Strategy 1C | 210 Weight$_1$ | 212 Weight$_2$ | 208b 2nd Option Strategy 2B | 210 Weight$_1$ | 212 Weight$_2$ |
| | 206d 1st Option Strategy 1D | 210 Weight$_1$ | 212 Weight$_2$ | 208e 2nd Option Strategy 2E | 210 Weight$_1$ | 212 Weight$_2$ |
| | 206e 1st Option Strategy 1E | 210 Weight$_1$ | 212 Weight$_2$ | 208f 2nd Option Strategy 2F | 210 Weight$_1$ | 212 Weight$_2$ |
| 202c Provisioning Strategy Group 3 | 206b 1st Option Strategy 1B | 210 Weight$_1$ | 212 Weight$_2$ | 208d 2nd Option Strategy 2D | 210 Weight$_1$ | 212 Weight$_2$ |
| | 206a 1st Option Strategy 1A | 210 Weight$_1$ | 212 Weight$_2$ | 208f 2nd Option Strategy 2F | 210 Weight$_1$ | 212 Weight$_2$ |
| | 206d 1st Option Strategy 1D | 210 Weight$_1$ | 212 Weight$_2$ | 208a 2nd Option Strategy 2A | 210 Weight$_1$ | 212 Weight$_2$ |

FIG. 2A

| PROVISIONING STRATEGY GROUP | PROVISIONING STRATEGIES | REGION DISTRIBUTION |
|---|---|---|
| DedicatePartner ReuseVNetFraud PrevSG 202 | 206a `{ "RegionStrategy": [ {`     210 `"name": "ReuseVNetStrategy",`     212 `"type": "sort",`     `"weight1": 0.1,// override at runtime by result calculation`     `"weight2": 1000` 206b `},{`     `"name": "FraudPreventStrategy",`     `"type": "sort",`     `"weight1": 0.2, // override at runtime by result calculation`     `"weight2": 100` 206c `},{`     `"name": "RegionProrationStrategy",`     `"type": "sort",`     `"weight1": 0.3, // override at runtime by result calculation`     `"weight2": 100` 206d `},{`     `"name": "ScaleUnitAvaQuotaStrategy",`     `"type": "sort",`     `"weight1": 0.4, // override at runtime by result calculation`     `"weight2": 100` `} ], "SubStrategy": [` 208a `{`     `"name": "ReuseVNetubStrategy",`     `"type": "sort",`     `"weight1": 0.6, // override at runtime by result calculation`     `"weight2": 1000` 208b `},{`     `"name": "CoreVMRatioStrategy",`     `"type": "sort",`     `"weight1": 0.6, // override at runtime by result calculation`     `"weight2": 100` 208c `},{`     `"name": "SubscriptionGroupStrategy",`     `"type": "sort",`     `"weight1": 0.6, // override at runtime by result calculation`     `"weight2": 1000` `} ] }` | America:eastus:30% America:eastus:2.3% America:westus:40% EMEA:germanywestcentral:10% EMEA:ukSouth:30% EMEA:ukwest:30% 205 |

FIG. 2B

FLEXIBLE SYSTEM DESIGN PATTERN FOR DISTRIBUTED SYSTEM

BACKGROUND

Distributed systems, such as cloud computing systems, are increasingly being applied in various industries. Amongst other benefits, distributed systems offer convenient and on-demand network access to a pool of configurable computing resources (e.g., networks, network bandwidth, servers, processing, memory, storage, applications, virtual machines, and services) that can be automatically provisioned and deployed.

It is with respect to these and other considerations that examples have been made. In addition, although relatively specific problems have been discussed, it should be understood that the examples should not be limited to solving the specific problems identified in the background.

SUMMARY

Examples described in this disclosure relate to systems and methods for determining a target virtual compute resource configuration for provisioning a virtual compute resource. A provisioning system and method are described that abstract various provisioning requirements into different provisioning strategies. The provisioning strategies include logic that, when executed, determine target provisioning options (e.g., a region and subscription configuration) for provisioning a virtual compute resource. Combinations of strategies are organized into various provisioning strategy groups using modifiable metadata in a configuration table. In some examples, the provisioning system receives a request for a target configuration for provisioning a virtual compute resource. In response, the provisioning system determines a provisioning strategy group that best satisfies the request and executes the provisioning strategies included in the group to determine target provisioning options for provisioning the requested virtual compute resource.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example by the accompanying figures, in which like references indicate similar elements. Elements in the figures are illustrated for simplicity and clarity and have not necessarily been drawn to scale.

FIG. 2A is an illustration of a configuration table according to an example;

FIG. 2B is an illustration of a provisioning strategy included in the configuration table of FIG. 2A according to an example;

DETAILED DESCRIPTION

Examples described in this disclosure relate to systems and methods for providing adaptive provisioning of a virtual compute resource. In a fixed provisioning system, different types of requirements of virtual compute resource customers are abstracted into different cloud computing system design patterns. As more customers request different types and variations of requirements for virtual compute resources, fixed cloud computing system design patterns may not satisfy a rapidly increasing customer demand for different types of virtual compute resource requirements. For instance, integrating new requirements for virtual compute resources requires substantial engineering effort on code design/fixes to integrate and deploy the new requirements. Moreover, the new code may introduce a regression when implementing new requirements.

Among other things, the technology disclosed herein alleviates the above issues by utilizing a provisioning system and methods that abstract various provisioning requirements into different provisioning strategies which can be automatically implemented in real time. The provisioning strategies include logic that, when executed, determines target provisioning options (e.g., a region and subscription configuration) for provisioning a virtual compute resource. Combinations of strategies are organized into various provisioning strategy groups using modifiable metadata in a configuration table. In some examples, the provisioning system receives a request for a target configuration for provisioning a virtual compute resource. In response, the provisioning system determines a provisioning strategy group that best satisfies the request and executes the provisioning strategies included in the group to determine target provisioning options for provisioning the requested virtual compute resource.

Figure 1:
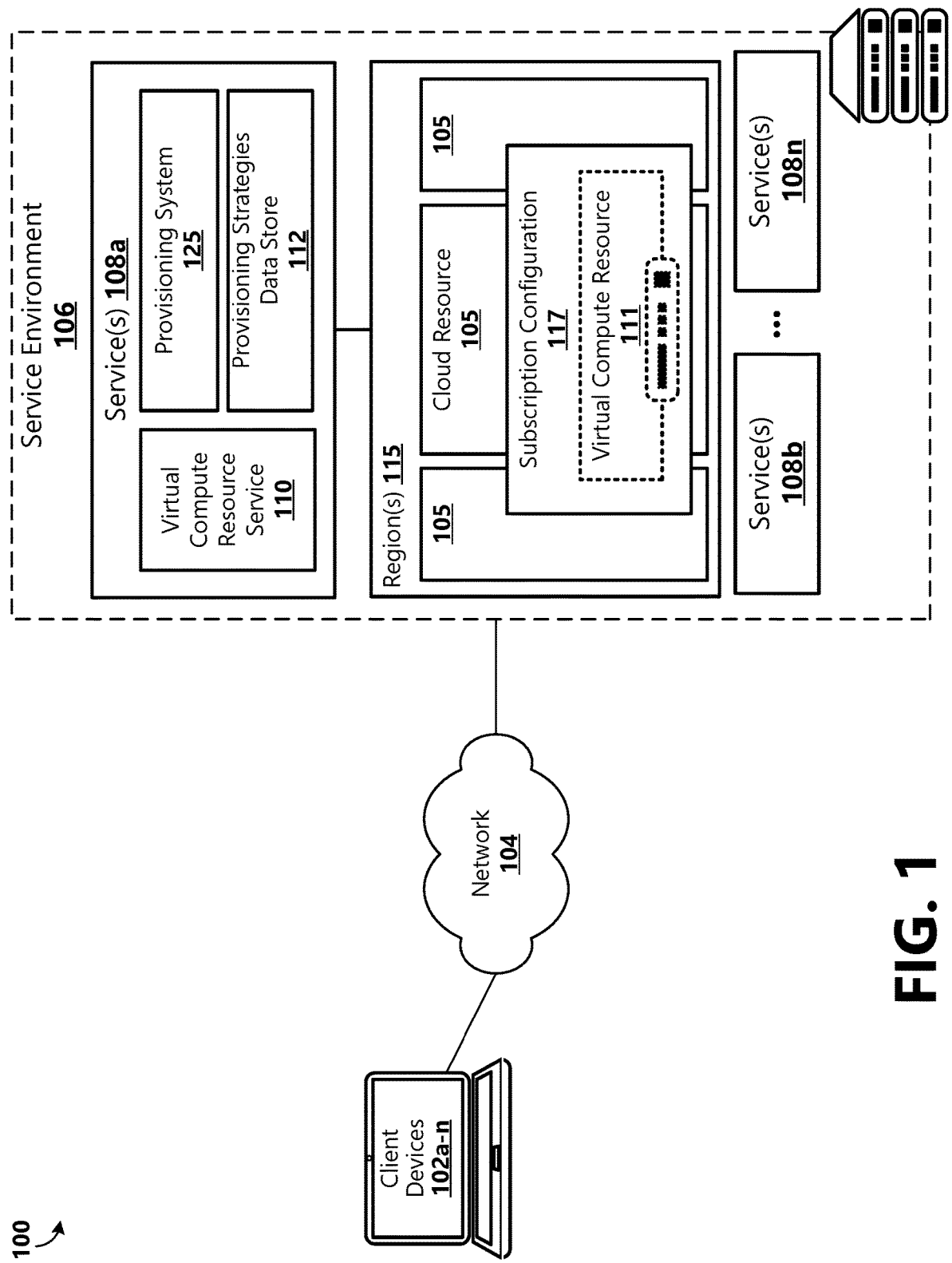
FIG. 1 is a block diagram of a system in which a virtual compute resource provisioning system is implemented according to an example.
Figure 7:
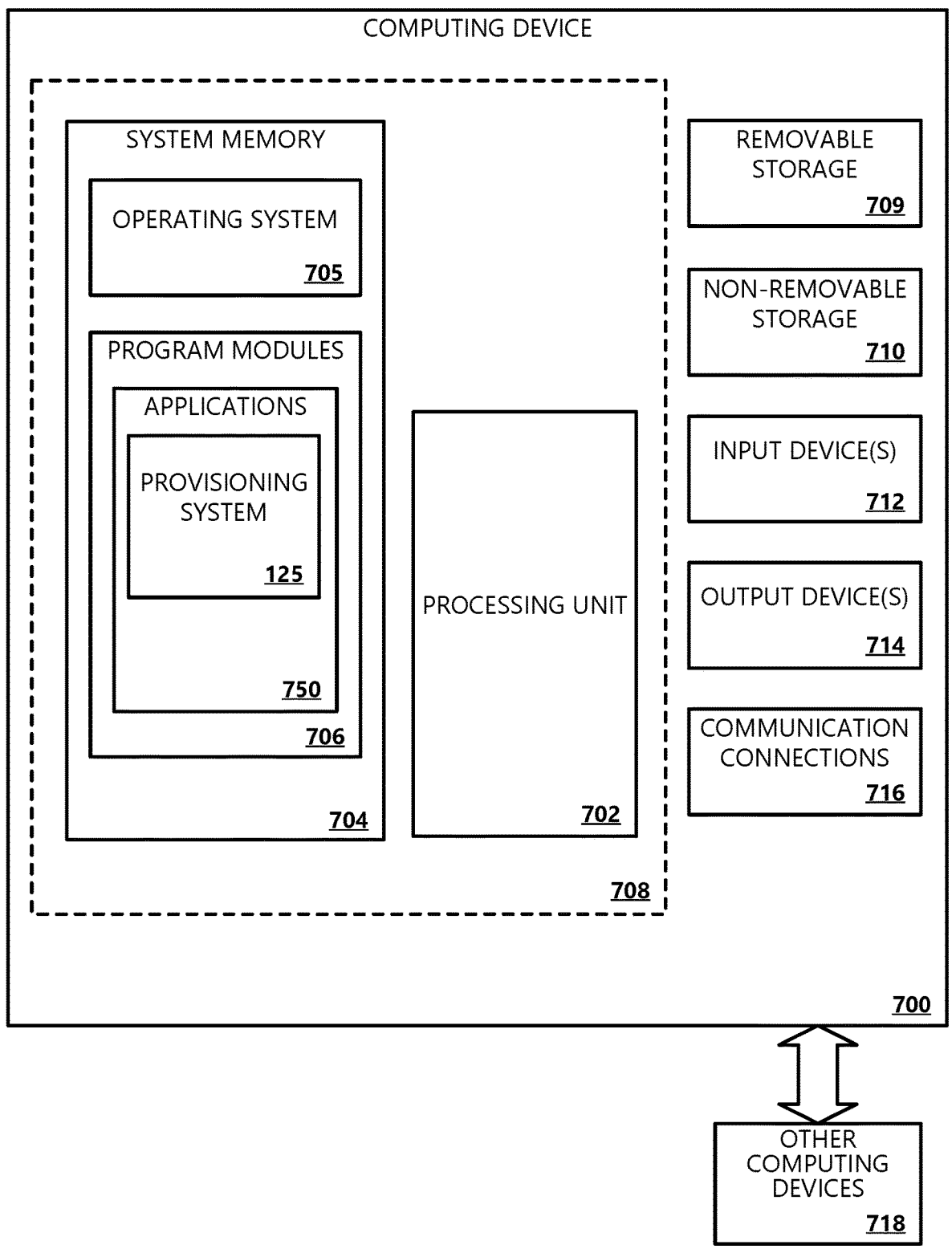
FIG. 7 is a block diagram illustrating example physical components of a computing device with which aspects of the disclosure may be practiced.

FIG. 1 is a block diagram of an example system 100 for provisioning a cloud computing resource in accordance with an example embodiment. The example system 100 as depicted is a combination of interdependent components that interact to form an integrated whole. Some components of the system 100 are illustrative of software applications, systems, or modules that operate on a computing device or across a plurality of computer devices. Any suitable computer device(s) may be used, including web servers, application servers, network appliances, dedicated computer hardware devices, virtual server devices, personal computers, a system-on-a-chip (SOC), or any combination of these and/or other computing devices known in the art. In one example, components of systems disclosed herein are implemented on a single processing device. The processing device may provide an operating environment for software components to execute and utilize resources or facilities of such a system. An example of processing device(s) comprising such an operating environment is depicted in FIGS. 7-8. In another example, the components of systems disclosed herein are distributed across multiple processing devices.

For instance, input may be entered on a user device or client device and information may be processed on or accessed from other devices in a network, such as one or more remote cloud devices or web server devices.

In FIG. 1, the system 100 includes client devices 102a-n (collectively "client device(s) 102"), a network 104, a service environment 106 including a plurality of computing service(s) 108a-108c (collectively "service(s) 108"). One of skill in the art will appreciate that the scale and structure of systems such as system 100 may vary and may include additional or fewer components than those described in FIG. 1. In one example, the service environment 106 or one or more service(s) 108 are incorporated into a client device(s) 102.

The client device(s) 102 detect and/or collect input data from one or more users or user devices. In some examples, the input data corresponds to user interaction with one or more software applications or services implemented by, or accessible to, the client device(s) 102. In other examples, the input data corresponds to automated interaction with the software applications or services, such as the automatic (e.g., non-manual) execution of scripts or sets of commands at scheduled times or in response to predetermined events. The user interaction or automated interaction may be related to the performance of user activity corresponding to a task, a project, a data request, or the like. The input data may include, for example, audio input, touch input, text-based input, gesture input, and/or image input. The input data is detected/collected using one or more sensor components of client device(s) 102. Examples of sensors include microphones, touch-based sensors, geolocation sensors, accelerometers, optical/magnetic sensors, gyroscopes, keyboards, and pointing/selection tools. Examples of client device(s) 102 include personal computers (PCs), mobile devices (e.g., smartphones, tablets, laptops, personal digital assistants (PDAs)), wearable devices (e.g., smart watches, smart eyewear, fitness trackers, smart clothing, body-mounted devices, head-mounted displays), and gaming consoles or devices, and Internet of Things (IoT) devices.

In various implementations, the client device(s) 102 provide the input data to the service environment 106. In some examples, the input data is provided to the service environment 106 using the network 104. Examples of the network 104 include one or a combination of a private area network (PAN), a local area network (LAN), a wide area network (WAN), and the like. For instance, although the network 104 is depicted as a single network, it is contemplated that the network 104 may represent several networks of similar or varying types. In some examples, the input data is provided to the service environment 106 without using the network 104.

The service environment 106 provides the client device(s) 102 access to various services 108a-n (collectively "service(s) 108"). In examples, the service(s) 108 provide access to a set of software and/or hardware functionality. Non-limiting examples of service(s) 108 include virtual meeting services, topic detection and/or classification services, data domain taxonomy services, expertise assessment services, content detection services, audio signal processing services, word processing services, spreadsheet services, presentation services, document-reader services, social media software or platforms, search engine services, media software or platforms, multimedia player services, content design software or tools, database software or tools, virtual computing device services, provisioning services, and alert or notification services. Other types of services 108 are possible and are within the scope of the present disclosure.

In some examples, the service environment 106 is implemented in a cloud-based environment or server-based environment using one or more cloud resources 105, such as server devices (e.g., web servers, file servers, application servers, database servers), edge computing devices (e.g., routers, switches, firewalls, multiplexers), personal computers (PCs), virtual devices, and mobile devices. The hardware of the cloud resources 105 may be distributed across disparate regions 115 in different geographic locations.

In some implementations, the service environment 106 includes numerous hardware and/or software components and is subject to one or more distributed computing models/services (e.g., Infrastructure as a Service (IaaS), Platform as a Service (PaaS), Software as a Service (SaaS), Functions as a Service (FaaS)). In some examples, services 108 are integrated into (e.g., hosted by or installed in) the service environment 106. In other examples, the service environment 106 is implemented in an on-premises environment (e.g., a home or an office) using such computing devices. Alternatively, one or more service(s) 108 are implemented externally to the service environment 106. For instance, one or more service(s) 108 may be implemented in a service environment separate from the service environment 106 or in client device(s) 102.

In accordance with at least one example implementation, at least one service 108a in the service environment 106 includes a virtual compute resource service 110 that provides virtual compute resources 111 to users. In some examples, the virtual compute resource service 110 is implemented as a PaaS, where virtual compute resources 111 are built on cloud resources 105 and are accessible to users of client devices 102 over a network 104 or a network addressable connection (e.g., using a web browser). In some examples, a virtual compute resource 111 is a virtual machine provisioned on a cloud resource 105, where the virtual compute resource 111 is accessed and operated remotely, rather than being stored and run locally on a user's client device 102. In some examples, a virtual compute resource 111 is built (e.g., configured and provisioned) as a collection of independently deployable services 108, where each service 108 is responsible for a specific function of the virtual compute resource 111 and communicates with other of the services 108 through defined interfaces. For example, the collection of services 108 may be included in a microservices architecture, where each service 108 is a self-contained and independently deployable codebase that communicates with other of the plurality of services 108 (or other services) via a well-defined interface using lightweight Application Programming Interfaces (APIs). In some examples, each service 108 implements a single capability of a virtual compute resource 111 within a bounded context, where each service 108 can be updated, deployed, and scaled to meet demand for specific functions. In some examples, the virtual compute resource 111 runs in a customer subscription, where a network interface card (NIC) of the virtual compute resource 111 is injected into a virtual network (vNet) in the customer's subscription. For example, network traffic enters and leaves the virtual compute resource 111 via the customer-managed vNet.

In some examples, the virtual compute resource service 110 provides a web-based interface that allows a user/customer to create and configure a virtual compute resource 111. For instance, the customer may include an individual or organization that uses the virtual compute resource service 110 to create and access a virtualized version of a computer from a remote location, allowing the customer to access their applications and data from a computing device with a network connection, rather than being limited to a single physical machine. In some examples, the interface allows the user to specify various parameters corresponding to the customer (e.g., customer name, customer ID, location) and the customer's requirements for the virtual compute resource 111 (e.g., an operating system, CPU, memory, storage, and networking options, other settings). In some examples, the virtual compute resource service 110 includes APIs that are used to automatically create a new virtual compute resource 111 and provision the virtual compute resource 111 with a target configuration. For instance, the virtual compute resource service 110 executes algorithms that perform operations/tasks to provision a new virtual compute resource 111 with a target configuration on one or more cloud resources 105 in a target region 115. In some examples, provisioning a virtual compute resource 111 includes performing a plurality of operations/tasks defined using declarative syntax (e.g., JavaScript Object Notation (JSON)), where the virtual compute resource 111 is provisioned through code rather than through manual processes.

In an example implementation, a configuration for a virtual compute resource 111 (referred to sometimes herein as a virtual compute resource configuration) includes a region 115 and a subscription configuration 117. For example, the subscription configuration 117 includes a configuration of system elements of the virtual compute resource 111, such as a type and number of CPUs, an amount of memory, and a size and type of storage (e.g., virtual hard drive (VHD) or virtual disk (VMDK) settings). In some examples, the subscription configuration 117 further includes a network configuration (e.g., virtual NIC settings, MAC address, VLAN ID, and IP address), a version and type of operating system, applications to be installed, tools and/or other settings for the virtual compute resource 111. The region 115 is a region 115 in which to locate the virtual compute resource 111. According to examples, regions 115 include cloud resources 105 capable of hosting or running one or a plurality of virtual compute resources 111, where different regions 115 represent different geographic locations, data centers, or resources in a given geographic region. In some examples, the virtual compute resource 111 is implemented in a microservices environment, where various microservices (e.g., services 108) interoperate as system elements of the virtual compute resource 111. In some examples, services 108 are distributed amongst a plurality of cloud resources 105 in a region 115.

As will be described in further detail below, the cloud computing service 110 includes or is in communication with a provisioning system 125 that receives a request for a virtual compute resource 111 and determines a target virtual compute resource configuration for provisioning the requested virtual compute resource 111. In some examples, the provisioning system 125 determines the target virtual compute resource configuration based on a flexible system pattern. For example, unlike a fixed system pattern that uses a pre-defined configuration of resources and settings to create a new virtual compute resource 111, the flexible system pattern allows for a target virtual compute resource configuration to be created at runtime (e.g., when the new virtual compute resource 111 is requested). Accordingly, a virtual compute resource 111 can be configured and provisioned to meet different customer requirements.

According to examples, system element options for a subscription configuration 117 are classified into various subscription provisioning strategies and options of regions 115 are classified into various region provisioning strategies. Provisioning strategies, for example, include logic defined by one or more algorithms that calculate/determine target system element options or target region options based on different customer requirements, cloud provider requirements, conditions of the cloud-based environment, or other options. As an example, a customer requirement may be associated with avoiding a specific type of CPU for the customer's virtual compute resources 111. Thus, a provisioning strategy is created including an algorithm that can determine target system element options that avoid specified types of CPUs. By executing the provisioning strategy, the provisioning system 125 determines a target subscription configuration 117 for a requested virtual compute resource 111 that satisfies the customer's requirement of avoiding the specific type of CPU. According to examples, the provisioning system 125 may further determine a target region 115 based on another provisioning strategy, such as a strategy created to ensure the availability, security, and performance of the virtual compute resource 111. Non-limiting examples of strategies associated with satisfying requirements of customers, cloud providers, and/or conditions of the cloud-based environment include preventing fraud, prorating a region 115, protecting a trial deployment, reusing a vNet, reusing a customer-managed key (CMK), avoiding insufficient SKU, scaling to available quota, a target vCPU-to-core ratio, window depth, random, default, etc.

In some examples, provisioning strategies are stored in a provisioning strategies data store 112 and are grouped into a plurality of provisioning strategy groups. In some examples, the provisioning strategies data store 112 is a database and the provisioning strategies and provisioning strategy groups are stored in one or more configuration tables. According to examples, each provisioning strategy in each group includes adjustable weights. For instance, the adjustable weights in the configuration table(s) allow the provisioning system 125 to prioritize different strategies to determine a target virtual compute resource configuration for a requested virtual compute resource 111. Thus, the virtual compute resource 111 can be flexibly configured and provisioned based on requirements of the customer and/or conditions of the cloud-based environment. An example configuration table is depicted in FIG. 2A and described below with reference to FIG. 2A. In some examples, the virtual compute resource service 110 communicates with one or more cloud resources 105 to host and initialize provisioning of a requested virtual compute resource 111 based on the target virtual compute resource configuration (e.g., target region configuration and target subscription configuration 117) determined by the provisioning service 125 for the requested virtual compute resource 111.

With reference now to FIG. 2A, an example configuration table 200 used to store provisioning strategy information is illustrated. According to an example implementation, provisioning strategy information includes a plurality of virtual compute resource provisioning options 204a and 204b (collectively "virtual compute resource provisioning options 204") corresponding to provisioning a virtual compute resource 111. For example, a first virtual compute resource provisioning option 204a corresponds to various first-option provisioning strategies 206a-206e (collectively, "first-option strategies 206") for determining a target region for provisioning a requested virtual compute resource 111. A second virtual compute resource provisioning option 204b corresponds to various second-option provisioning strategies 208a-f (collectively, "second-option strategies 208") for determining a subscription configuration 117 for the virtual compute resource 111. As can be appreciated, in other implementations, additional and/or other types of provisioning options can be included in the configuration table 200.

As depicted, different combinations of first-option strategies 206 and second-option strategies 208 are assembled into various provisioning strategy groups 202a-202c (collectively "provisioning strategy groups 202"). For instance, a first example provisioning strategy group 202a includes first-option strategies: strategy 1A 206a, strategy 1B 206b, and strategy 1C 206c and second-option strategies: strategy 2A 208a, strategy 2B 208b, and strategy 2C 208c. Additionally, a second example provisioning strategy group 202b includes first-option strategies: strategy 1C 206c, strategy 1D 206d, and strategy 1E 206e and second-option strategies: strategy 2B 208b, strategy 2E 208e, and strategy 2F 208f. Further, a third example provisioning strategy group 202c includes first-option strategies: strategy 1B 206b, strategy 1A 206a, and strategy ID 206d and second-option strategies: strategy 2D 208d, strategy 2F 208f, and strategy 2A 208a.

With reference to FIG. 2B, an example provisioning strategy group 202 included in an example configuration table 200 is illustrated. According to examples and as depicted, each provisioning strategy group 202 includes strategy group metadata including various information, such as strategies (e.g., first-option strategies 206a-206d and second-option strategies 208a-208c) included in the provisioning strategy group 202, weights (e.g., first weights 210 and second weights 212), region distributions 205 (e.g., region distribution ratios), etc.

According to an aspect, because strategy group metadata is pre-defined in the configuration table 200, the provisioning system 125 has the ability to select and implement strategy groups almost immediately, and define (e.g., create) new strategy groups as needed. For instance, new first-option strategies 206 and/or second-option strategies 208 can be dynamically generated according to different received inputs and/or customer requirements, cloud environment conditions, etc. Moreover, strategy group metadata can be added at runtime in the configuration table 200 to support new requirements. Accordingly, new virtual compute resource features can be provided to customers quickly and easily.

In some examples, the first-option strategies 206 and second-option strategies 208 include a first weight 210 and a second weight 212. In some examples, the first weight 210 and the second weight 212 have a predefined value included in the configuration table 200 and are adjustable (e.g., prior to and/or at runtime). For instance, the first weight 210 is automatically adjusted (e.g., at runtime based on cloud environmental factors) and the second weight 212 is user-adjustable (e.g., by a systems engineer). In some examples, A/B testing is supported by the provisioning system 125. For example, A/B testing can be performed by setting or modifying the first and/or second weights 210 and/or 212 of provisioning strategies 206 and 208 in different provisioning strategy groups 202 (e.g., so that half of requests in the test are allocated to one strategy group (A) and the other half of requests in the test are allocated to the other strategy group (B)).

According to an example implementation, and as will be described in further detail below, the prioritization system 125 uses the first weight 210 and second weight 212 to determine target virtual compute resource provisioning options 204 for a new virtual compute resource 111. In some examples, the prioritization system 125 prioritizes a first-option strategy 206 and a second-option strategy 208 in one or more rounds of strategy executions based on the first weight 210 and second weight 212 to determine a first-option result (e.g., a list of region distributions 205 ranked by a calculated value) and a second-option result (e.g., a list of subscription configurations 117 ranked by a calculated value). The first-option result and second-option result in a final round of strategy executions are used to determine a target region result and a target subscription result. In some examples, the target region result includes a top-ranked region 115 included in the final-round first-option result. Further, in some examples, the target subscription result includes a top-ranked subscription configuration 117 included in the final-round second-option result.

Figure 3:
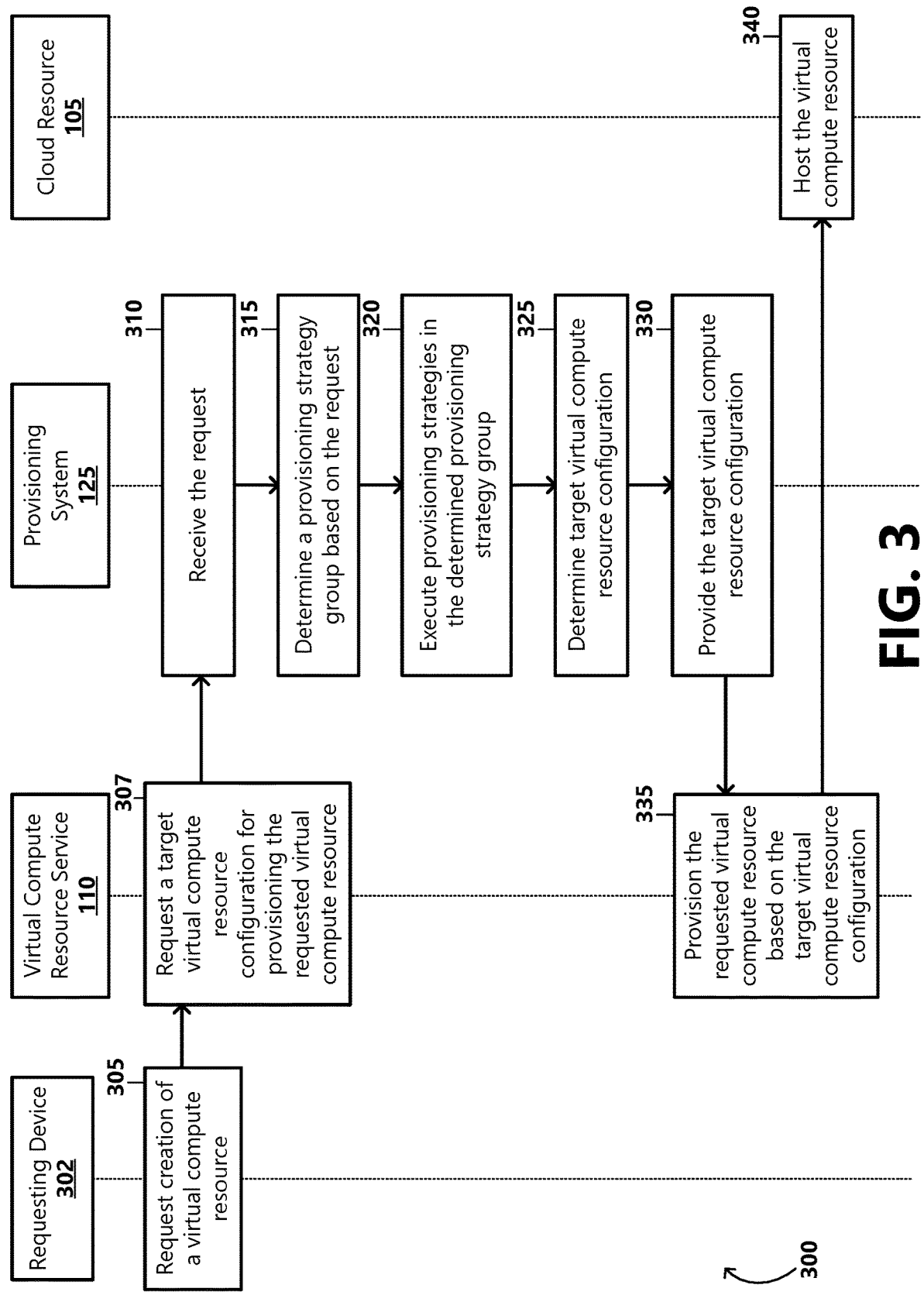
FIG. 3 is a flow diagram depicting an example method of determining a target configuration to provision a virtual compute resource.

FIG. 3 is a flow diagram 300 illustrating determining a target configuration to provision a virtual compute resource 111 according to an example. For example, FIG. 3 is illustrated from the point of view of a requesting device 302, the virtual compute resource service 110, the provisioning system 125, and a cloud resource 105. As depicted, at operation 305 the requesting device 302 makes a request for a virtual compute resource 111. The requesting device 302, for example, is implemented as a client device 102 in communication with the virtual compute resource service 110. In some examples, the virtual compute resource service 110 provides a web-based interface via which a customer/user of the client device 102 can select to create and configure a new virtual compute resource 111. In some examples, the interface allows the user to specify various parameters corresponding to the customer and the customer's requirements for the virtual compute resource 111. Some non-limiting example input parameters include customer identification information (e.g., customer name, customer ID, location), tenant information, a network connection type, desired subscription information (e.g., CPU, RAM, and storage configuration, applications, resources available to applications), and an encryption type (e.g., CMK encryption). Other input parameters corresponding to customer requirements are possible and are within the scope of the present disclosure. According to examples, input parameters for a requested virtual compute resource 111 are included in a request that is provided to the virtual compute resource service 110.

At operation 307, the virtual compute resource service 110 requests a target virtual compute resource configuration for provisioning the requested virtual compute resource 111. In some examples, the virtual compute resource service 110 communicates a request for a target region 115 and a target subscription configuration 117 to the provisioning system 125. According to examples, the request includes the input parameters included in the virtual compute resource request from the requesting device 302.

At operation 310, the provisioning system 125 receives the request including the input parameters. At operation 315, the provisioning system 125 determines a provisioning strategy group 202 based on the input parameters of the request. In some examples, the provisioning system 125 accesses the configuration table 200 and uses a filter to determine/select a provisioning strategy group 202 that best satisfies the input parameters. For instance, based in input parameters, a provisioning strategy group from a plurality of predefined strategy groups is selected.

At operation 320, the provisioning system 125 executes the provisioning strategies included in the selected provisioning strategy group 202 in one or more rounds or iterations. According to an example implementation, the provisioning system 125 performs three rounds of strategy executions, where in each round, the provisioning system 125 executes each first-option strategy 206 and each second-option strategy 208 in the selected provisioning strategy group 202. According to examples, the provisioning system 125 executes an algorithm(s) included each first-option strategy 206 to determine/calculate values for different regions 115 and to generate a region result (e.g., a list of regions 115 ranked by the calculated values). For instance, the services associated with the strategies of the selected strategy group may be executed or evaluated in different regions to determine which region provides the best results for implementing the particular strategy. For instance, if the strategy group is a fraud prevention strategy group, the strategies in the strategy group may be evaluated across a plurality of regions, and the region that results in the least amount of fraudulent requests or attack attempts is selected as the best region. In another example implementation, the provisioning system 125 executes an algorithm(s) included each second-option strategy 208 to determine/calculate values for different subscription configurations 117 and to generate a subscription result (e.g., a list of subscription configurations 117 ranked by the calculated values). Similar to region analysis, the services associated with the strategies of the selected strategy group may be executed or evaluated for different subscriptions to determine which subscription provides the best results for implementing the particular strategy.

At operation 320, the provisioning system 125 further applies the first weights 210 and second weights 212 assigned to the first-option strategies 206 and second-option strategies 208 to the region results and subscription results. In some examples, the first weight 210 and second weight 212 are combined and the region result of the first-option strategy 206 with the highest combined weight is selected as a first-round first-option result and the subscription result of the second-option strategy 208 with the highest combined weight is selected as a first-round second-option result. When the provisioning system 125 performs multiple rounds of strategy executions to determine a target configuration result, the results of previous rounds are used to override/adjust the first weights 210 of the provisioning strategies in subsequent rounds. Additionally, second weights 212 of one or more provisioning strategies can be manually adjusted in subsequent rounds to prioritize different first-option strategies 206 and/or second-option strategies 208.

At operation 325, the provisioning system 125 determines a target virtual compute resource configuration for provisioning the requested virtual compute resource 111. In some examples, the provisioning system 125 selects the first-option result and second-option result in the final round of strategy executions (e.g., third round results) as the final result, where the final result includes the target virtual compute resource configuration (e.g., a target region 115 and a target subscription configuration 117) for the requested virtual compute resource 111. An example method of executing (operation 320) provisioning strategies and determining (operation 325) a target virtual compute resource configuration is described below with reference to FIGS. 4 and 5.

At operation 330, the provisioning system 125 communicates the target region 115 and target subscription configuration 117 to the virtual compute resource service 110. At operation 335, the virtual compute resource service 110 communicates operations/tasks of a provisioning process to a cloud resource 105 in the target region 115 to provision the virtual compute resource 111 with the target subscription configuration 117 on the cloud resource 105 along the services corresponding to the strategies in the selected strategy group. In other examples, the provisioning system 125 communicates directly with the cloud resource 105 to provision the requested virtual compute resource 111. At operation 340, the cloud resource 105 initializes and hosts the virtual compute resource 111, according to the strategies in the selected strategy group, at the identified region with the identified subscription.

Figure 4:
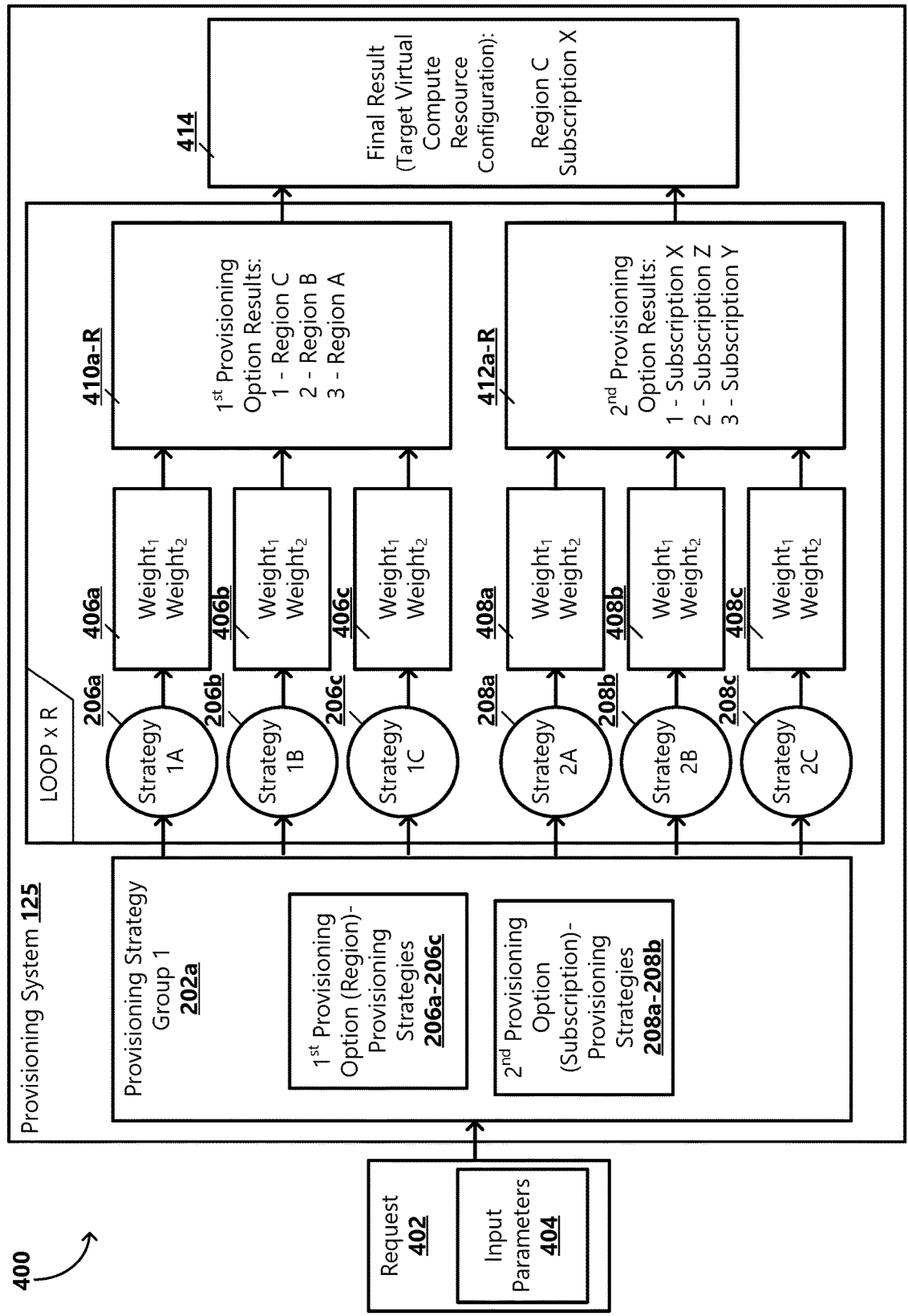
FIG. 4 is a flow diagram of an example method of executing provisioning strategies to determine target virtual compute resource provisioning options for provisioning a requested virtual compute resource.

FIG. 4 is a diagram illustrating an example method of executing provisioning strategies 206 and 208 to determine target virtual compute resource provisioning options for provisioning a requested virtual compute resource 111 according to an example. As depicted in FIG. 4, a request 402 including various input parameters 404 for a target virtual compute resource configuration for a virtual compute resource 111 is received by the provisioning system 125. In response to receiving the request 402, the provisioning system 125 uses the input parameters 404 to determine a best-matched provisioning strategy group 202. For example, the provisioning system 125 accesses a configuration table, such as the example configuration table 200 depicted in FIG. 2, and determines a provisioning strategy group 202 that best satisfies input parameters 404 included in the request 402. As an example, an input parameter 404 may include an identifier of a customer who initiated the request 402, where the identifier of the customer is linked to a dedicated subscription to hold their resources. Another input parameter 404 may include an indication to enable vNet for the requested virtual compute resource 111. Accordingly, the filter of the provisioning system 125 determines, for example, the strategies included in the first provisioning strategy group 202*a* best satisfy the input parameters 404 included in the request 402. For instance, the first provisioning strategy group 202*a* includes provisioning strategies 206 that address various customer requirements indicated by the input parameters 404.

According to examples, the first provisioning strategy group 202*a* includes a plurality of first-option provisioning strategies 206*a*-206*c* corresponding to a first virtual compute resource provisioning option 204*a* and a plurality of second-option provisioning strategies 208*a*-208*c* corresponding to a second virtual compute resource provisioning option 204*b*. As an example, the first virtual compute resource provisioning option 204*a* is a region 115 for provisioning the requested virtual compute resource 111, where the first provisioning strategy group 202*a* includes a plurality of region provisioning strategies corresponding to determining the region 115 for provisioning the requested virtual compute resource 111. For instance, first-option strategy 1A 206*a* may be a strategy related to scaling to available quota, first-option strategy 1B 206*b* may be a strategy related to fraud prevention, and first-option strategy 1C 206*c* may be a strategy related to a dedicated subscription partner. For instance, execution of the fraud prevention strategy (e.g., first-option strategy 1B 206*b*) includes executing an algorithm configured to fail a virtual compute resource provisioning request upon detection of a fraudulent request. Thus, executing the region-associated fraud prevention provisioning strategy (e.g., first-option strategy 1B 206*b*) generates an ordered (e.g., ranked) list of regions 115 determined based on prioritizing fraud prevention operations. Additionally, execution of the other first-option provisioning strategies in the first provisioning strategy group 202*a* (e.g., first-option strategy 1B 206*b*, first-option strategy 1C 206*c*) includes executing other algorithms configured to calculate/determine a list of regions 115 based on other business logic for region selection. As another example, the second virtual compute resource provisioning option 204*b* is a subscription configuration 117 to provision the requested virtual compute resource 111, where the first provisioning strategy group 202a further includes a plurality of subscription provisioning strategies corresponding to determining the subscription configuration 117 to provision the requested virtual compute resource 111. For instance, second-option strategy 2A 208a may represent a reuse vNet on a sub-level strategy, second-option strategy 2B 208b may represent a core VM ration strategy, and second-option strategy 2C 208c may represent a subscription group strategy.

According to examples, the provisioning system 125 executes each of the first-option strategies 206a-206c in parallel and each of the second-option strategies 208a-208c in parallel to generate a first-option result 410 and a second-option result 412. In some examples, the provisioning system 125 executes each of the first-option provisioning strategies 206a-206c in a loop, for example, for a defined number (R) of rounds to generate a plurality of first-option results 410a-R (collectively "first-option results 410") and a plurality of second-option results 412a-R (collectively "second-option results 412").

In some examples, the provisioning system 125 executes the provisioning strategies 206 and 208 in a first round to determine first-round strategy results for each strategy and further applies the predefined weights 210 and 212 in the configuration table 200 to determine a first-round first-option result 410a and a first-round second-option result 412a. In some examples, the provisioning system 125 further executes the first-option strategies 206 and second-option strategies 208 in the first provisioning strategy group 202a a subsequent number (R) of rounds. According to examples, at the end of each round, the provisioning system 125 feeds the results from the round and previous round(s) to the provisioning strategies in the first provisioning strategy group 202a. For instance, the provisioning system 125 feeds the first-option results 410 from previous rounds to the first-option strategies 206. The provisioning system 125 further feeds the second-option results 412 from previous rounds to the second-option strategies 208. According to examples, the first-option strategies 206 and second-option strategies 208 use the previous result(s) to determine strategy results (e.g., a ranked list of regions 205 and a ranked list of subscription configurations 117) in each subsequent round. Additionally, the provisioning system 125 uses adjusted weights 210, 212 to determine the subsequent-round first-option results 410b-R and subsequent-round second-option results 412b-R.

In some examples, the results of a final round of strategy executions (e.g., the final-round first-option result 410R and final-round second-option result 412R) are used to determine the final result 414. In some examples, the provisioning system 125 selects the top-ranked final-round first-option result 410R (e.g., a top-ranked region 115) and the top-ranked final-round second-option result 412R (e.g., a top-ranked subscription configuration 117) as the final result 414. According to examples, the final result 414 is determined as the target virtual compute resource configuration for the requested virtual compute resource 111.

Figure 5:
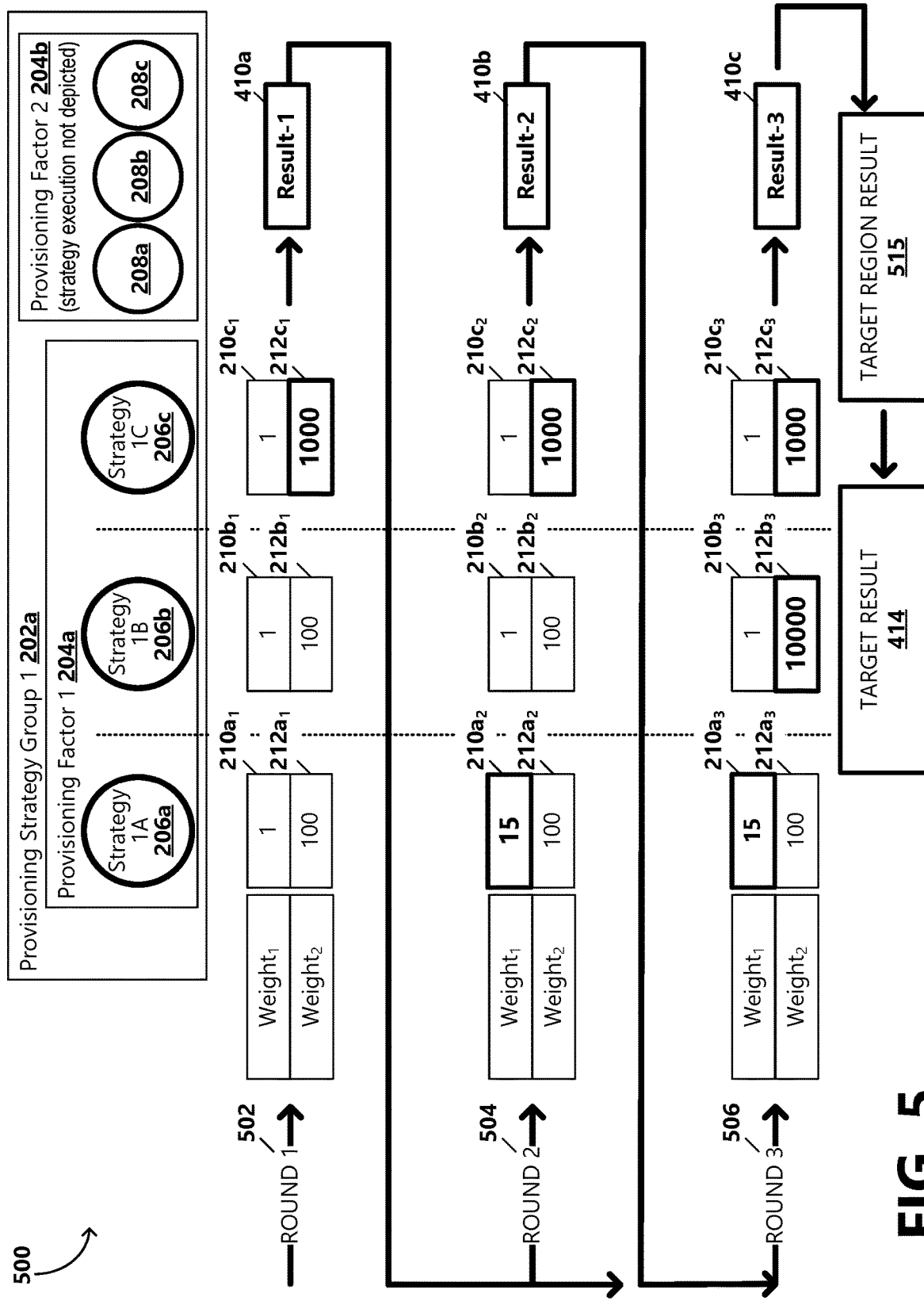
FIG. 5 is a flow diagram depicting an example method of determining a target first-option result of the final result for a virtual compute resource configuration.

FIG. 5 is a diagram depicting an example method 500 of determining a target first-option result of the final result 414 for a virtual compute resource configuration. As can be appreciated, although not illustrated in FIG. 5, examples can also be applied to executing the second-option provisioning strategies 208a-208c in the first provisioning strategy group 202a to determine a target second-option result of the final result 414. As depicted in FIG. 5, the provisioning system 125 executes the first-option provisioning strategies 206 in a loop including three rounds 502, 504, and 506. For example, in each round 502, 504, and 506, the provisioning system 125 executes first-option strategy 1A 206a, first-option strategy 1B 206b, and first-option strategy 1C 206c. As described above, first-option strategy 1A 206a may be a strategy related to scaling to available quota, first-option strategy 1B 206b may be a strategy related to fraud prevention, and first-option strategy 1C 206c may be a strategy related to a dedicated subscription partner.

In some examples, for each of the first-option provisioning strategies 206a-206c included in the first provisioning strategy group 202a, execution of the first-option provisioning strategy generates a first-option strategy result. In some examples, a first-option strategy result includes an ordered (e.g., ranked) list of the first provisioning option 204 (e.g., regions 115) determined by executing one or more algorithms included in a corresponding first-option (region) provisioning strategy 206. In some examples, each strategy result (e.g., list of regions 115) is sorted according to a value from the highest to lowest value. In some examples, each region 115 in the list is assigned a rank or position, with the highest-ranked region 115 positioned at the top of the list and the lowest-ranked region 115 positioned at the bottom. In some examples, each strategy result includes only a top-ranked first virtual compute resource provisioning option result (e.g., region 115). Further, for example, the provisioning system 125 determines a second-option strategy result for each second-option (subscription) provisioning strategy 208 in the first provisioning strategy group 202a by executing the second-option strategies 208. For instance, each subscription result includes an ordered (e.g., ranked) list of subscription configurations 117 or a top-ranked subscription configuration 117 determined by executing algorithms included in a corresponding second-option (subscription) provisioning strategy 208.

According to examples, the provisioning system 125 determines a first-round first-option result 410a in the first round 502 of strategy executions. For example, the provisioning system 125 determines a first-round first-option result 410a for the first virtual compute resource provisioning option 204a and a first-round second-option result 412a (not shown in FIG. 5) for the second virtual compute resource provisioning option 204b. In some examples, the provisioning system 125 selects, as a first-round first-option result 410a, a first-round first-option strategy result of a first-option strategy 206 with a highest combined value (also referred to as a combined weight) of the first weight 210 and second weight 212. In some examples, the combined weight is the product of the first weight 210 and the second weight 212. In some examples, in the first round 502 of strategy executions, the provisioning system 125 uses the predefined values in the configuration table 200 for the first weights 210 and second weights 212 of the provisioning strategies 206.

As an example, in the first round 502, the first weight 210a1 of first-option strategy 1A 206a is 1, the second weight 212a1 is 100, and thus, the combined weight is 100. Additionally, the first weight 210b1 of first-option strategy 1B 206a is 1, the second weight 212b1 is 100, and, thus, the combined weight is 100. Further, the first weight 210c1 of first-option strategy 1C 206a is 1, the second weight 212c1 is 1000, and, thus, the combined weight is 1000. Accordingly, the first-round first-option result 410a for the first provisioning option 204a is the first-round strategy result for first-option strategy 1C 206c. For example, the first-round first-option result 410a includes a ranked list of regions 115 determined based on logic corresponding to first-option strategy 1C 206c (e.g., reuse vNet strategy).

As mentioned, the combined weight of first-option strategy 1C 206c in the example depicted in FIG. 5 is 1000. For instance, in the configuration table 200, preference is given to first-option strategy 1C 206c in the first provisioning strategy group 202a (e.g., by assigning a high predefined value to first-option strategy 1C's second weight 212). Thus, for example, the high predefined value of the second weight 212 of first-option strategy 1C 206c causes the combined weight to be higher than the other first-option strategies (e.g., first-option strategies 1A 206a and 1B 206b). According to examples, in other provisioning strategy groups 202 in the configuration table 200 that include first-option strategy 1C 206c (e.g., the second provisioning strategy group 202b), the predefined value of the first and/or second weight 210,212 of first-option strategy 1C 206c may be different and, therefore, less than, greater than, or equal to the values of the first and/or second weights 210,212 of other first-option provisioning strategies 206 included in the other provisioning strategy group(s) 202.

In some examples, the provisioning system 125 feeds the first-round first-option result 410a for the first provisioning option 204a into each first-option strategy 206 in the first provisioning strategy group 202a in subsequent rounds (e.g., a second round 504 and a third round 506) of strategy executions. Additionally, the provisioning system 125 feeds a determined first-round second-option result 412a for the second provisioning option 204b into each second-option strategy 208 in the first provisioning strategy group 202a in subsequent rounds (e.g., a second round 504 and a third round 506) of strategy executions.

In some examples, in one or more subsequent rounds 504, 506, the first and/or second weight 210, 212 of one or more of the first-option strategies 206 or second-option strategies 208 may be modified/adjusted (e.g., automatically or manually), for instance, based on changes in the cloud operating environment. This allows the provisioning system 125 and, thus, the virtual compute resource service 110, to operate as a flexible (e.g., not fixed) model. For instance, the provisioning system 125 can, at runtime, reprioritize different combinations of provisioning strategies 206, 208 and/or activate/deactivate different provisioning strategies 206, 208 for intelligently selecting virtual compute resource provisioning options 204 (e.g., the region 115 and the subscription configuration 117) for a requested virtual compute resource 111 based on conditions of the cloud operating environment, subscriber requirements, and/or other factors at runtime.

As an example and as depicted in FIG. 5, in a second round 504, the first-round first-option result 410a (e.g., first-round strategy result for first-option strategy 1C 206c) is applied as an input to the first-option provisioning strategies 206 in the first provisioning strategy group 202a. In some examples, in the second round 504, the first-option (region) provisioning strategies 206 included in the first provisioning strategy group 202a are executed to generate second-round strategy results for each first-option provisioning strategy 206. For instance, the second-round strategy results include an updated ordered (e.g., ranked) list of regions 115 determined by executing algorithms included in the first-option strategies 206 (e.g., region provisioning strategies). For example, the algorithms are configured to factor in the first-round first-option result 410a to determine the regions 115 and region order for selecting a target region 115 to provision the requested virtual compute resource 111.

Additionally, after determining the first-round first-option result 410a, a change in the cloud operating environment may cause a different provisioning strategy (e.g., first-option strategy 1A 206a) to be prioritized. As an example, a quota of cloud resources 105 in a particular region 115 may become limited and the region 115 may become restricted from use for the requested virtual compute resource 111. Accordingly, the provisioning strategy related to scaling to available quota (e.g., first-option strategy 1A 206a) is prioritized in the second round 504 by increasing the value of the first weight 210a2 of first-option strategy 1A 206a (e.g., from 1 in the first round 502 to 15 in the second round 504). For instance, the provisioning system 125 receives an indication about the restricted resources in the particular region 115 and automatically adjust the first weight 210a2 of first-option strategy 1A 206a for subsequent rounds 504 and 506. For instance, the value of the second weight 212c2 of first-option strategy 1C 206c is persisted from the first round 502 into the second round 504 (e.g., the value of the second weight 212c2 of first-option strategy 1C 206c in the first round 502 and the second round 504 is 1000). In the example depicted, in the second round 504, the first weight 210a2 and the second weight 212a2 of first-option strategy 1A 206a generates a combined weight for first-option strategy 1A 206a (e.g., 1500) that is higher than the combined weights of first-option strategy 1B 206b (e.g., 100) and first-option strategy 1C 206c (e.g., 1000). Thus, the provisioning system 125 selects the second-round strategy result of first-option strategy 1A 206a as the second-round first-option result 410b.

According to another example, after determining the second-round first-option result 410b, a change in the cloud operating environment may cause a different first-option provisioning strategy (e.g., first-option strategy 1B 206b) to be prioritized. As an example, a systems engineer may identify an increased number of fraudulent requests and, accordingly, the engineer manually adjusts the second weight 212b3 of first-option strategy 1B 206b to prioritize the fraud prevention strategy. As an example and as depicted in FIG. 5, in a third round 506, the first-round first-option result 410a (e.g., first-round strategy result for first-option strategy 1C 206c) and the second-round first-option result 410b (e.g., second-round strategy result for first-option strategy 1A 206a) are applied as inputs to the first-option provisioning strategies 206 in the first provisioning strategy group 202a. In some examples, in the third round 506, the first-option (region) provisioning strategies 206 included in the first provisioning strategy group 202a are executed to generate third-round strategy results for each first-option provisioning strategy 206. For instance, the third-round strategy results include an updated ordered (e.g., ranked) list of regions 115 determined by executing algorithms included in the first-option strategies 206 (e.g., region provisioning strategies). For example, the algorithms are configured to factor in the first-round first-option result 410a and the second-round first-option result 410b to determine regions 115 and a region order for selecting a target region 115 to provision the requested virtual compute resource 111.

According to examples, based on the adjustment to the second weight 212b3 of first-option strategy 1B 206b, the fraud prevention strategy is prioritized to protect the cloud environment by rejecting fraudulent requests. For example, in the third round 506, the first weight 210a3 and the second weight 212a3 of provisioning strategy 1B 206b produce a combined weight for first-option strategy 1B 206b (e.g., 10000) that is higher than the combined weight of first-option strategy 1A 206A (e.g., 1500) and the combined weight of first-option strategy 1C 206c (e.g., 1000). Thus, the third-round strategy result determined for first-option strategy 1B 206 is selected as the third-round first-option result 410c. According to examples, the provisioning system 125 further determines a third-round strategy result for each second-option (subscription) provisioning strategy 208 in the first provisioning strategy group 202a, and further determines a third-round second-option result 412c for the first provisioning strategy group 202a based on combined weights of the second-option (subscription) provisioning strategies 208.

According to examples, after a final round of strategy executions, the provisioning system 125 determines a final result 414 including a target virtual compute resource configuration for the requested virtual compute resource 111. For example, the final result 414 includes a target region result 515 and a target subscription configuration result for the requested virtual compute resource 111. In the example depicted in FIG. 5, the third round 506 is the final round. Accordingly, the third-round first-option result 410c is selected for determining the target region result 515. In some examples, the target region result 515 includes an ordered (e.g., ranked) list of regions 115 determined by executing algorithms included in a first-option (region) provisioning strategies 206. In other examples, the target region result 515 includes a top-ranked region 115. Additionally, a third-round second-option (subscription) result 412c is selected for determining the target subscription result, where the target subscription result includes an ordered (e.g., ranked) list of subscription configurations 117 or a top-ranked subscription configuration 117 determined by executing algorithms included in a second-option (subscription) provisioning strategy 208.

In some examples, upon determining the target region result 515 and target subscription configuration result, the provisioning system 125 communicates the target virtual compute resource configuration to the virtual compute resource service 110 for provisioning the requested virtual compute resource 111. In some examples, the virtual compute resource service 110 communicates operations/tasks of the provisioning process to a cloud resource 105 in the target region 515 to provision the virtual compute resource 111 with the target subscription configuration 117 on the cloud resource 105.

Figure 6:
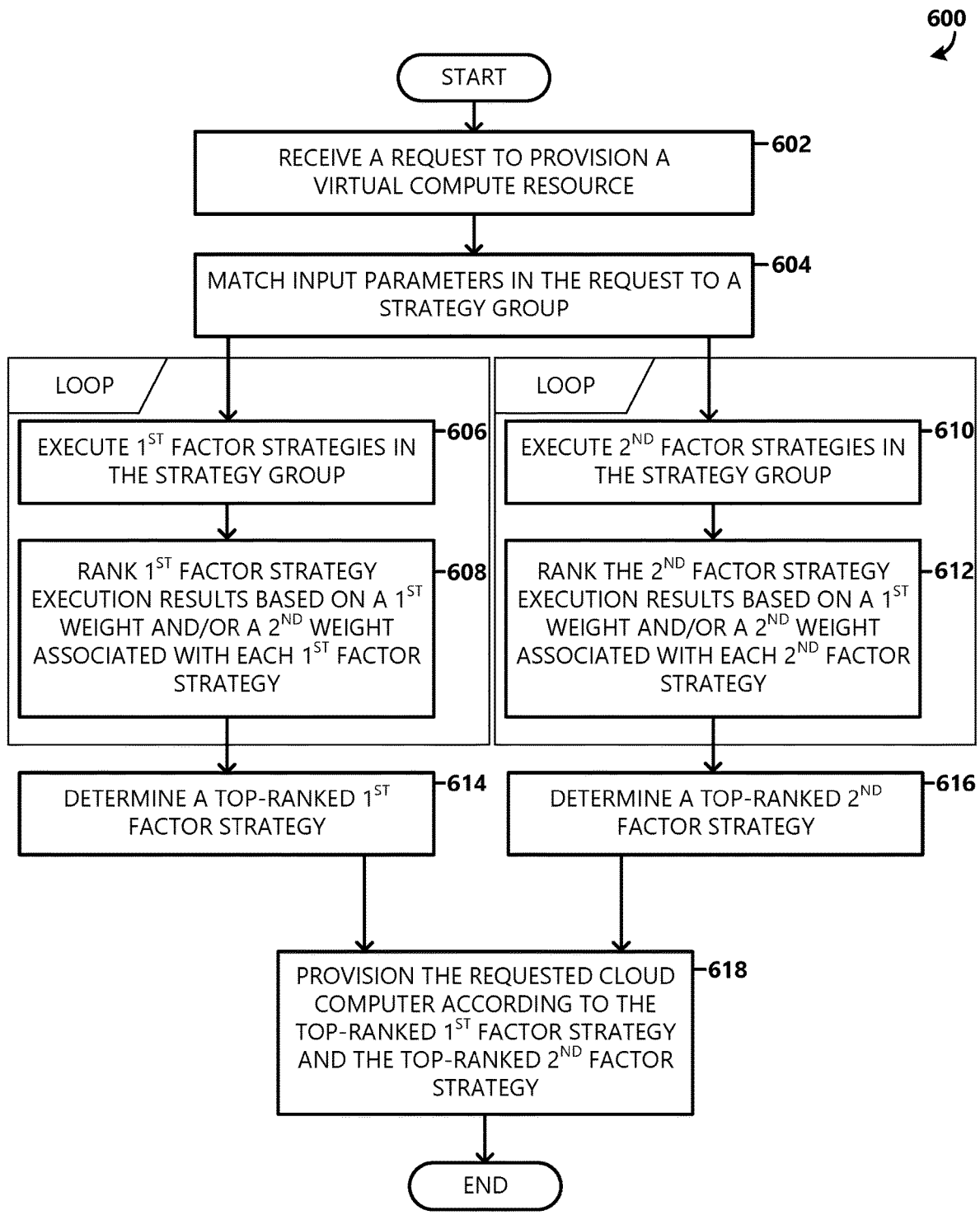
FIG. 6 is a flowchart depicting operations of an example method for determining a target configuration for provisioning a virtual compute resource according to an example.

With reference now to FIG. 6, a flowchart depicting a method 600 for provisioning a virtual compute resource 111 according to an example is provided. The operations of method 600 may be performed by one or more computing devices, such as the provisioning system 125. At operation 602, a request 402 is received to determine a target virtual compute resource configuration to provision a requested virtual compute resource 111. According to examples, the request 402 includes various input parameters 404 that represent various customer requirements for the requested virtual compute resource 111.

At operation 604, the input parameters 404 included in the received request 402 are matched to a provisioning strategy group 202. The provisioning system 125 may obtain provisioning strategy information associated with the identified provisioning strategy group 202 for determining target virtual compute resource provisioning options 204 (e.g., region 115 and subscription configuration 117) for the requested virtual compute resource 111.

As an example, the provisioning system 125 identifies a provisioning strategy group 202 in the configuration table 200 that includes a combination of strategies 206 that best satisfy the input parameters 404. For instance, a filter may be configured based on the available strategy groups and the input parameters. When the input parameters are received, the available strategy groups are filtered according to the provided input parameters. The filter may be configured to remove strategy groups that would be unable to the handle the requirements set in the input parameters. Applying the filter to select the provisioning strategy group 202 may also adjust or override the first weight 210 of strategies within the strategy group. For example, if a strategy within the selected strategy group is required based on the input parameters, the first weight 210 of the strategy may be overridden or adjusted to 1 (e.g., 100%). As a specific example, the input parameters may indicate that dedicated subscription is required to hold the resources associated with the request. The filter thus selects a strategy group that is capability of providing the dedicated subscription. The strategy within the strategy group that provides the dedicated subscription (e.g., SubscriptionGroupStrategy) has its first weight in the configuration table adjusted or overridden to 100%. The input parameters may also indicate that the vNet should be reused but has a lower priority than the dedicated subscription. Accordingly, a strategy within the strategy group for reusing a vNet (e.g., ResuseVNETOnSubLevelStrategy) may also have its first weight increased but to a level less than the first weight of the dedicated subscription strategy, such as 80%.

At operation 606, the provisioning system 125 executes the first-option provisioning strategies 206 included in the identified provisioning strategy group 202 for a defined number (R) of rounds. For example, executing the first-option provisioning strategies 206 in each round generates a value for each of a plurality of regions 115 and further generates a first-option strategy result for each first-option provisioning strategy 206 including a list of regions 115 ranked by the generated values.

At operation 608, a first weight 210 and a second weight 212 of each first-option strategy 206 is combined and the combined weights are used to determine a first-option result 410 from the first-option strategy results. For example, the first-option strategy result of the first-option strategy 206 with the highest combined weight is selected as the first-option result 410 of the round. According to examples, in the first round 502, the predefined values of the first weight 210 and second weight 212 of each first-option strategy 206 are used to produce the combined weights. In subsequent rounds, the first weight 210 and a second weight 212 may be adjusted automatically by the system or manually by a systems engineer. Thus, for example, different first-option provisioning strategies 206 may be prioritized for determining the first-option result 410 in each round.

As depicted in FIG. 6, in some examples, operations 610 and 612 are executed concurrently to operations 606 and 608. In other examples, operations 610 and 612 are executed subsequent or prior to operations 606 and 608. At operation 610, the provisioning system 125 executes the second-option strategies 208 included in the identified provisioning strategy group 202 for a defined number (R) of rounds. For example, executing the second-option provisioning strategies 208 in each round generates a value for each of a plurality of subscription configurations 117 and further generates a second-factor strategy result for each second-option provisioning strategy 208 including a list of subscription configurations 117 ranked by the generated value.

At operation 612, a first weight 210 and a second weight 212 of each second-option provisioning strategy 208 is combined and the combined weights are used to determine a second-option result 412 from the second-option strategy results. For example, the second-option strategy result of the second-option provisioning strategy 208 with the highest combined weight is selected as the second-option result 412 of the round. According to examples, in the first round 502, the predefined values of the first weight 210 and a second weight 212 of each second-option provisioning strategy 208 are used to produce the combined weights. In subsequent rounds, the first weight 210 and second weight 212 may be adjusted automatically by the system or manually by a systems engineer. Thus, for example, different second-option provisioning strategies 208 may be prioritized for determining the second-option result 412 in each round.

At operation 614, the first-option result 410 of the final round of the defined number (R) of rounds is selected to determine the target region result 515. In some examples, the top-ranked region 115 included in the final-round first-option result 410 is determined to be the target region result 515.

At operation 616, the second-option result 412 of the final round of the defined number (R) of rounds is selected to determine the target subscription result. In some examples, the top-ranked subscription configuration 117 included in the final-round second-option result 412 is determined to be the target subscription result.

At operation 618, the target region result 515 and the target subscription result are included in a target result 414. According to examples, the target result 414 includes a target virtual compute resource configuration to provision the requested virtual compute resource 111. In some examples, the target result 414 is communicated to the virtual compute resource service 110. In some examples, providing the target result 414 triggers initialization of the virtual compute resource 111 on a cloud resource 105 in the target region 115 of the target region result 515 according to the target subscription configuration 117 of the target subscription result. The virtual compute resource 111 may also be provisioned or operated with the services or operations corresponding to the strategies of the strategy group selected in operation 604.

FIG. 7 and the associated description provides a discussion of a variety of operating environments in which examples of the disclosure may be practiced. However, the devices and systems illustrated and discussed with respect to FIG. 7 are for purposes of example and illustration, a vast number of computing device configurations that may be utilized for practicing aspects of the disclosure, described herein.

FIG. 7 is a block diagram illustrating physical components (e.g., hardware) of a computing device 700 with which examples of the present disclosure may be practiced. The computing device components described below may be suitable for one or more of the components of the system 100 described above. In a basic configuration, the computing device 700 includes at least one processing unit 702 and a system memory 704. Depending on the configuration and type of computing device 700, the system memory 704 may comprise volatile storage (e.g., random access memory), non-volatile storage (e.g., read-only memory), flash memory, or any combination of such memories. The system memory 704 may include an operating system 705 and one or more program modules 706 suitable for running software applications 750, the provisioning system 125, and other applications.

The operating system 705 may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 may perform processes including one or more of the stages of the method 600 illustrated in FIG. 6. Other program modules that may be used in accordance with examples of the present disclosure and may include applications such as electronic mail and contacts applications, word processing applications, spreadsheet applications, database applications, slide presentation applications, drawing or computer-aided application programs, etc.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to detecting an unstable resource may be operated via application-specific logic integrated with other components of the computing device 700 on the single integrated circuit (chip). Examples of the present disclosure may also be practiced using other technologies capable of performing logical operations such as, for example, AND, OR, and NOT, including mechanical, optical, fluidic, and quantum technologies.

The computing device 700 may also have one or more input device(s) 712 such as a keyboard, a mouse, a pen, a sound input device, a touch input device, a camera, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include RF transmitter, receiver, and/or transceiver circuitry; universal serial bus (USB), parallel, and/or serial ports.

The term computer readable media as used herein includes volatile and nonvolatile, removable and non-removable media implemented in any method or technology for storage of information, such as computer readable instructions, data structures, or program modules. The system memory 704, the removable storage device 709, and the non-removable storage device 710 are all computer readable media examples (e.g., memory storage.) Computer readable media include random access memory (RAM), read-only memory (ROM), electrically erasable programmable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer readable media may be part of the computing device 700. Computer readable media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

In an aspect, a system is provided for provisioning a cloud-based service, comprising: a processing system; and memory storing instructions that, when executed by the processor, cause the system to: receive a request to provision a cloud-based service, the request comprising input parameters; based on the input parameters, identify a strategy group from a plurality of strategy groups, wherein each strategy group includes a plurality of strategies for a provisioning option, with each strategy having one or more preconfigured weights; execute the strategies of the identified strategy group to generate a strategy result for the provisioning option for each strategy; rank the generated strategy results based on the preconfigured weights; determine a top-ranked strategy result as a target provisioning option for the cloud-based service; and provision the requested cloud-based service according to the target provisioning option.

In an example, executing the strategies comprises executing the strategies in a plurality of rounds to generate, in each of the plurality of rounds, a strategy result for the provisioning option for each strategy; and prior to each subsequent round of the plurality of rounds, the instructions further cause the system to feed the top-ranked strategy result of the previous rounds into the strategies of the identified strategy group. In a further example, the target provisioning option for the cloud-based service comprises a top-ranked strategy result of a final round of the plurality of rounds as the target provisioning option. In yet another example, the instructions cause the system to: receive an adjustment to at least one preconfigured weight of the one or more preconfigured weights; and rank the generated subsequent strategy results based on the at least one adjusted preconfigured weight. In still another example, the one or more preconfigured weights include a first weight and a second weight; and the adjustment to the at least one preconfigured weight comprises an adjustment to at least one of the first weight and the second weight of the at least one preconfigured weight. In still yet another example, the plurality of strategy groups are stored in a configuration table.

In still yet a further example, each strategy group includes a plurality of first-option strategies for a first provisioning option and a plurality of second-option strategies for a second provisioning option; and the strategy result for the provisioning option comprises: a first-option strategy result for the first provisioning option for each first-provisioning option strategy; and a second-option strategy result for the second provisioning option for each second-provisioning option strategy. In still yet another further example, the first provisioning option is a region for the cloud-based service; and the second provisioning option is a subscription configuration for the cloud-based service. In still yet another example, the instructions cause the system to: rank the generated first-provisioning option strategy results based on the one or more preconfigured weights; determine a top-ranked first-option strategy result as the target provisioning option for the first provisioning option and a top-ranked second-option strategy result as the target provisioning option for the second provisioning option; and provision the requested cloud-based service according to the target provisioning option for the first provisioning option and the target provisioning option for the second provisioning option.

In another aspect, a computer-implemented method is provided for provisioning a cloud-based service, comprising: receiving a request to provision a cloud-based service, the request comprising input parameters; based on the input parameters, filtering a plurality of strategy groups to select a particular strategy group, wherein each strategy group includes a plurality of strategies for a provisioning option; executing the strategies of the identified strategy group to generate a strategy result for the provisioning option for each strategy; ranking the generated strategy results; determining a top-ranked strategy result as a target provisioning option for the cloud-based service; and providing the target provisioning option for the cloud-based service to provision the requested cloud-based service according to the target provisioning option.

In an example, executing the strategies comprises executing the strategies in a plurality of rounds to generate, in each of the plurality of rounds, a strategy result for the provisioning option for each strategy. In a further example, prior to each subsequent round of the plurality of rounds, feeding the top-ranked strategy result of the previous rounds into the strategies of the identified strategy group. In yet another example, determining the top-ranked strategy result as the target provisioning option for the cloud-based service comprises determining the top-ranked strategy result of a final round of the plurality of rounds as the target provisioning option. In still yet another example, each strategy in the strategy group includes at least one preconfigured weight, the method further comprises: receiving an adjustment to the at least one preconfigured weight; and ranking the generated subsequent strategy results based on the at least one adjusted preconfigured weight. In still yet another example, the at least one preconfigured weight includes a first weight and a second weight; and receiving the adjustment to the at least one preconfigured weight comprises receiving an adjustment to at least one of the first weight and the second weight of the at least one preconfigured weight. In still yet a further example, each strategy group includes a plurality of first-option strategies for a first provisioning option and a plurality of second-option strategies for a second provisioning option; and generating the strategy result for the provisioning option comprises: generating a first provisioning option strategy result for the first provisioning option for each first provisioning option strategy; and generating a second provisioning option strategy result for the second provisioning option for each second provisioning option strategy.

In still yet another further example, the method further comprises: ranking the generated first-option strategy results based on preconfigured weights of the strategies; determining a top-ranked first-option strategy result as the target provisioning option for the first provisioning option and a top-ranked second-option strategy result as the target provisioning option for the second provisioning option; and providing the target provisioning option for the first provisioning option and the target provisioning option for the second provisioning option to provision the requested cloud-based service according to the target provisioning options. In still yet another example, the method comprises executing the strategies of the identified strategy group in parallel. In still a further example, filtering the strategy groups also includes adjusted a weight of a strategy in the selected strategy group.

In another aspect, a computer-implemented method is provided for provisioning a cloud-based service, comprising: receiving a request to provision a cloud-based service, the request comprising input parameters; based on the input parameters, identifying a strategy group from a plurality of strategy groups, wherein: each strategy group includes a plurality of first-option strategies for a first provisioning option and a plurality of second-option strategies for a second provisioning option; and each of the first-option strategies and the second-option strategies comprises a preconfigured weight; executing the first-option strategies of the identified strategy group to generate a first-option result for the first provisioning option for each first-option strategy; rank the generated first-option results based on the preconfigured weights; execute the second-option strategies of the identified strategy group to generate a second-option result for the second provisioning option for each second-option strategy; rank the generated second-option results based on the preconfigured weights; determine a top ranked first-option result as a target first provisioning option and a top ranked second-option result as a target second provisioning option; and provision the requested cloud-based service according to the target first provisioning option and the target second provisioning option.

It is to be understood that the methods, modules, and components depicted herein are merely examples. Alternatively, or in addition, the functionality described herein can be performed, at least in part, by one or more hardware logic components. For example, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

The functionality associated with some examples described in this disclosure can also include instructions stored in a non-transitory media. The term "non-transitory media" as used herein refers to any media storing data and/or instructions that cause a machine to operate in a specific manner. Illustrative non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Examples of transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system for provisioning a cloud-based service, comprising:
 a processing system; and
 memory storing instructions that, when executed by the processor, cause the system to:
  receive a request to provision a cloud-based service, the request comprising input parameters;
  based on the input parameters, identify a strategy group from a plurality of strategy groups, wherein each strategy group includes a plurality of strategies for one or more provisioning options that are associated with different aspects of cloud resource provisioning, with each strategy having one or more preconfigured weights;
  execute the strategies of the identified strategy group to generate a strategy result for the provisioning option for each strategy;
  rank the generated strategy results based on the preconfigured weights;
  determine a top-ranked strategy result as a target provisioning option for the cloud-based service; and provision the requested cloud-based service according to the target provisioning option.

2. The system of claim 1, wherein:
executing the strategies comprises executing the strategies in a plurality of rounds to generate, in each of the plurality of rounds, a strategy result for the provisioning option for each strategy; and
prior to each subsequent round of the plurality of rounds, the instructions further cause the system to feed the top-ranked strategy result of the previous rounds into the strategies of the identified strategy group.

3. The system of claim 2, wherein the target provisioning option for the cloud-based service comprises a top-ranked strategy result of a final round of the plurality of rounds as the target provisioning option.

4. The system of claim 2, wherein the instructions cause the system to:
receive an adjustment to at least one preconfigured weight of the one or more preconfigured weights; and
rank the generated subsequent strategy results based on the at least one adjusted preconfigured weight.

5. The system of claim 4, wherein:
the one or more preconfigured weights include a first weight and a second weight; and
the adjustment to the at least one preconfigured weight comprises an adjustment to at least one of the first weight and the second weight of the at least one preconfigured weight.

6. The system of claim 1, wherein the plurality of strategy groups are stored in a configuration table.

7. The system of claim 1, wherein:
each strategy group includes a plurality of first-option strategies for a first provisioning option and a plurality of second-option strategies for a second provisioning option; and
the strategy result for the provisioning option comprises:
a first-option strategy result for the first provisioning option for each first-provisioning option strategy; and
a second-option strategy result for the second provisioning option for each second-provisioning option strategy.

8. The system of claim 7, wherein:
the first provisioning option is a region for the cloud-based service; and
the second provisioning option is a subscription configuration for the cloud-based service.

9. The system of claim 7, wherein the instructions cause the system to:
rank the generated first-provisioning option strategy results based on the one or more preconfigured weights;
determine a top-ranked first-option strategy result as the target provisioning option for the first provisioning option and a top-ranked second-option strategy result as the target provisioning option for the second provisioning option; and
provision the requested cloud-based service according to the target provisioning option for the first provisioning option and the target provisioning option for the second provisioning option.

10. A computer-implemented method for provisioning a cloud-based service, comprising: receiving a request to provision a cloud-based service, the request comprising input parameters;
based on the input parameters, filtering a plurality of strategy groups to select a particular strategy group, wherein each strategy group includes a plurality of strategies for one or more provisioning options that are associated with different aspects of cloud resource provisioning;
executing the strategies of the identified strategy group to generate a strategy result for the provisioning option for each strategy;
ranking the generated strategy results;
determining a top-ranked strategy result as a target provisioning option for the cloud-based service; and
providing the target provisioning option for the cloud-based service to provision the requested cloud-based service according to the target provisioning option.

11. The method of claim 10, wherein executing the strategies comprises executing the strategies in a plurality of rounds to generate, in each of the plurality of rounds, a strategy result for the provisioning option for each strategy.

12. The method of claim 11, further comprising:
prior to each subsequent round of the plurality of rounds, feeding the top-ranked strategy result of the previous rounds into the strategies of the identified strategy group.

13. The method of claim 12, wherein determining the top-ranked strategy result as the target provisioning option for the cloud-based service comprises determining the top-ranked strategy result of a final round of the plurality of rounds as the target provisioning option.

14. The method of claim 11, wherein each strategy in the strategy group includes at least one preconfigured weight, the method further comprises:
receiving an adjustment to the at least one preconfigured weight; and
ranking the generated subsequent strategy results based on the at least one adjusted preconfigured weight.

15. The method of claim 14, wherein:
the at least one preconfigured weight includes a first weight and a second weight; and
receiving the adjustment to the at least one preconfigured weight comprises receiving an adjustment to at least one of the first weight and the second weight of the at least one preconfigured weight.

16. The method of claim 10, wherein:
each strategy group includes a plurality of first-option strategies for a first provisioning option and a plurality of second-option strategies for a second provisioning option; and
generating the strategy result for the provisioning option comprises:
generating a first provisioning option strategy result for the first provisioning option for each first provisioning option strategy; and
generating a second provisioning option strategy result for the second provisioning option for each second provisioning option strategy.

17. The method of claim 16, further comprising:
ranking the generated first-option strategy results based on preconfigured weights of the strategies;
determining a top-ranked first-option strategy result as the target provisioning option for the first provisioning option and a top-ranked second-option strategy result as the target provisioning option for the second provisioning option; and
providing the target provisioning option for the first provisioning option and the target provisioning option for the second provisioning option to provision the requested cloud-based service according to the target provisioning options.

18. The method of claim 10, comprising executing the strategies of the identified strategy group in parallel.

19. The method of claim 10, wherein filtering the strategy groups also includes adjusted a weight of a strategy in the selected strategy group.

20. A computer-implemented method for provisioning a cloud-based service, comprising:
- receiving a request to provision a cloud-based service, the request comprising input parameters;
- based on the input parameters, identifying a strategy group from a plurality of strategy groups, wherein:
  - each strategy group includes a plurality of first-option strategies for a first provisioning option and a plurality of second-option strategies for a second provisioning option, wherein the first and second provisioning options are associated with different aspects of cloud resource provisioning; and
  - each of the first-option strategies and the second-option strategies comprises a preconfigured weight;
- executing the first-option strategies of the identified strategy group to generate a first-option result for the first provisioning option for each first-option strategy;
- rank the generated first-option results based on the preconfigured weights;
- execute the second-option strategies of the identified strategy group to generate a second-option result for the second provisioning option for each second-option strategy;
- rank the generated second-option results based on the preconfigured weights;
- determine a top ranked first-option result as a target first provisioning option and a top ranked second-option result as a target second provisioning option; and
- provision the requested cloud-based service according to the target first provisioning option and the target second provisioning option.

* * * * *